United States Patent [19]

Okuyama et al.

[11] Patent Number: 4,867,434
[45] Date of Patent: Sep. 19, 1989

[54] APPARATUS FOR GRASPING ENDS OF BELT-LIKE MEMBERS

[75] Inventors: Koji Okuyama; Minoru Sawai, both of Kodaira, Japan

[73] Assignee: Bridgestone Corporation, Tokyo, Japan

[21] Appl. No.: 212,992

[22] Filed: Jun. 29, 1988

[30] Foreign Application Priority Data

Jul. 9, 1987 [JP] Japan ................................ 62-172670

[51] Int. Cl.⁴ ............................................. B65H 3/24
[52] U.S. Cl. .................................. 271/42; 156/405.1; 83/151
[58] Field of Search ...................... 271/42; 156/405.1; 83/277, 151

[56] References Cited

U.S. PATENT DOCUMENTS

| | | |
|---|---|---|
| 3,496,811 | 2/1970 | Flanagan et al. ................. 83/277 |
| 3,772,125 | 11/1973 | Leblond ........................... 156/405.1 |
| 4,079,645 | 3/1978 | Nunes et al. ..................... 83/277 |
| 4,448,627 | 5/1984 | Satoh . |
| 4,465,536 | 8/1984 | Makino . |
| 4,470,866 | 9/1984 | Satoh . |
| 4,596,617 | 6/1986 | Ishii . |
| 4,729,521 | 3/1988 | Kuho . |

FOREIGN PATENT DOCUMENTS

| | | |
|---|---|---|
| 59-55733 | 3/1984 | Japan . |
| 59-207227 | 11/1984 | Japan . |
| 61-286124 | 12/1986 | Japan . |
| 62-11633 | 1/1987 | Japan . |
| 62-119028 | 5/1987 | Japan . |

Primary Examiner—H. Grant Skaggs
Attorney, Agent, or Firm—Sughrue, Mion, Zinn, Macpeak & Seas

[57] ABSTRACT

An apparatus for grasping ends of a belt-like member, a support base for supporting the ends of the belt-like member, and an embracing member extending in width directions of the belt-like member and movable toward and away from the support base for urging the ends of the belt-like member against the support base when the embracing member has moved toward said support base. The apparatus further comprises at least one folding member extendible from and retractable into the support base for folding the ends of the belt-like member along edges of the embracing member when the folding member has extended from the support base, and embracing plates supported by the embracing member movably toward and away from the embracing member for embracing the folded ends of the belt-like member over their widths in cooperation with the embracing member when the embracing plates have moved toward the embracing member.

8 Claims, 4 Drawing Sheets

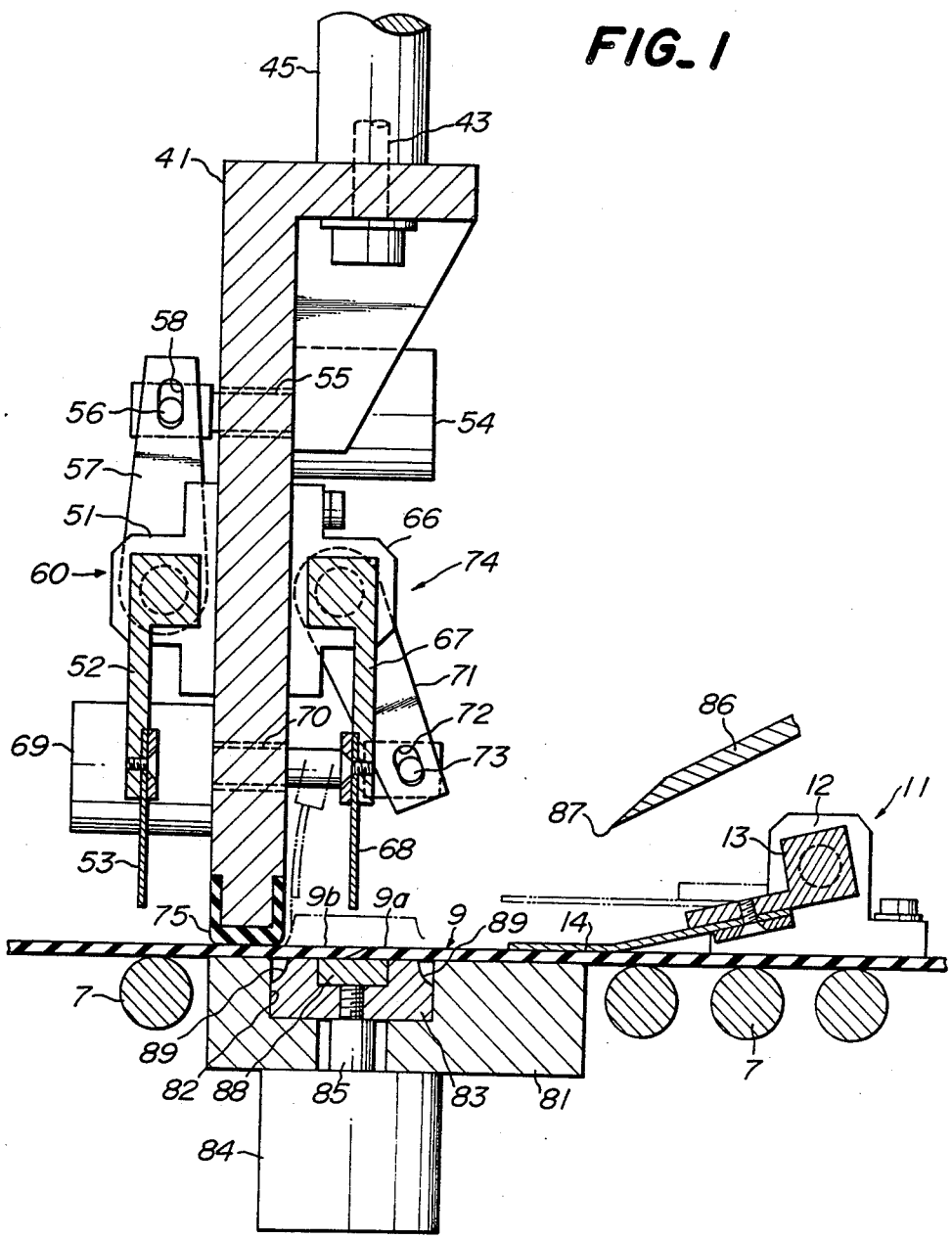

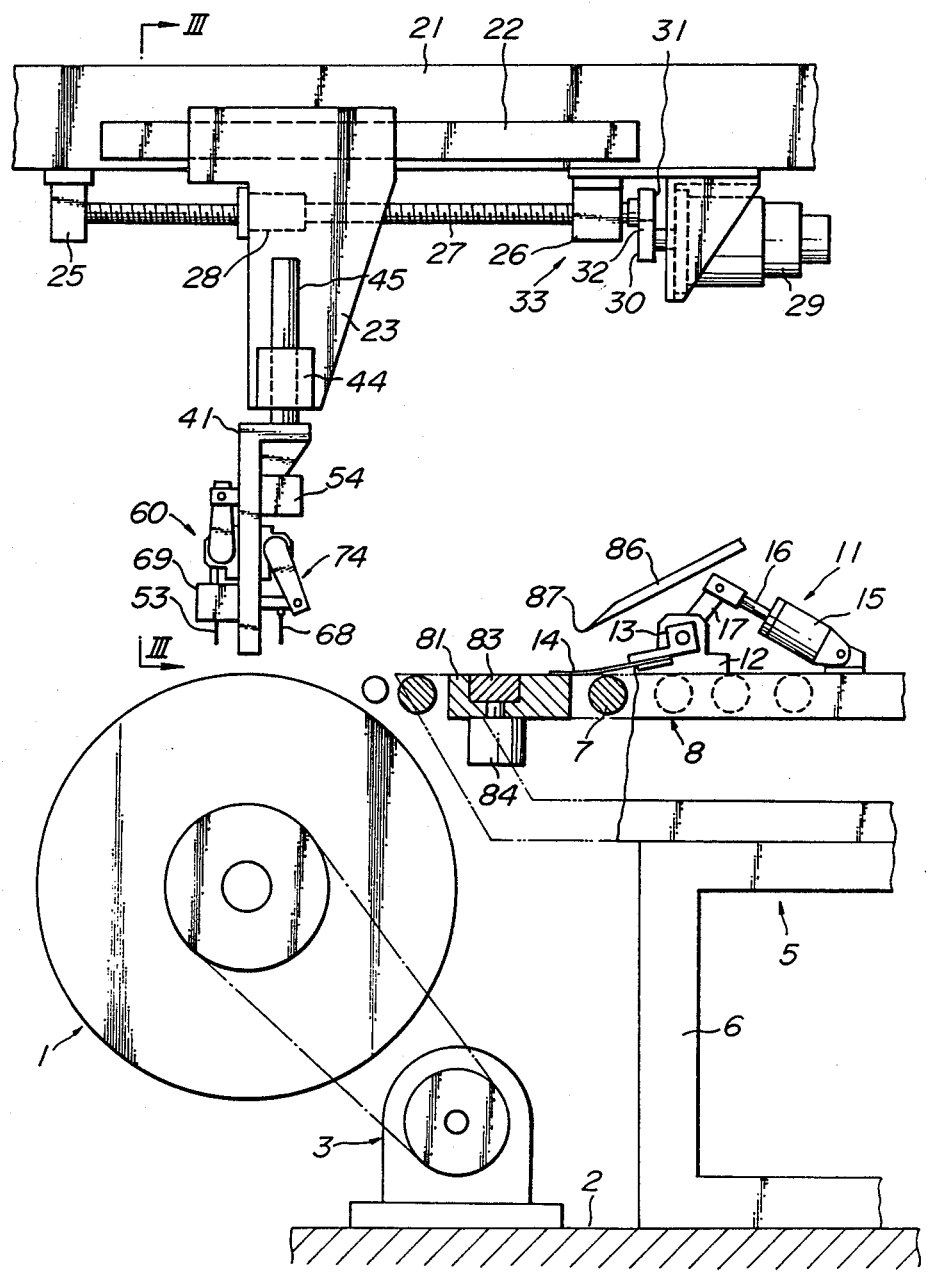
FIG_2

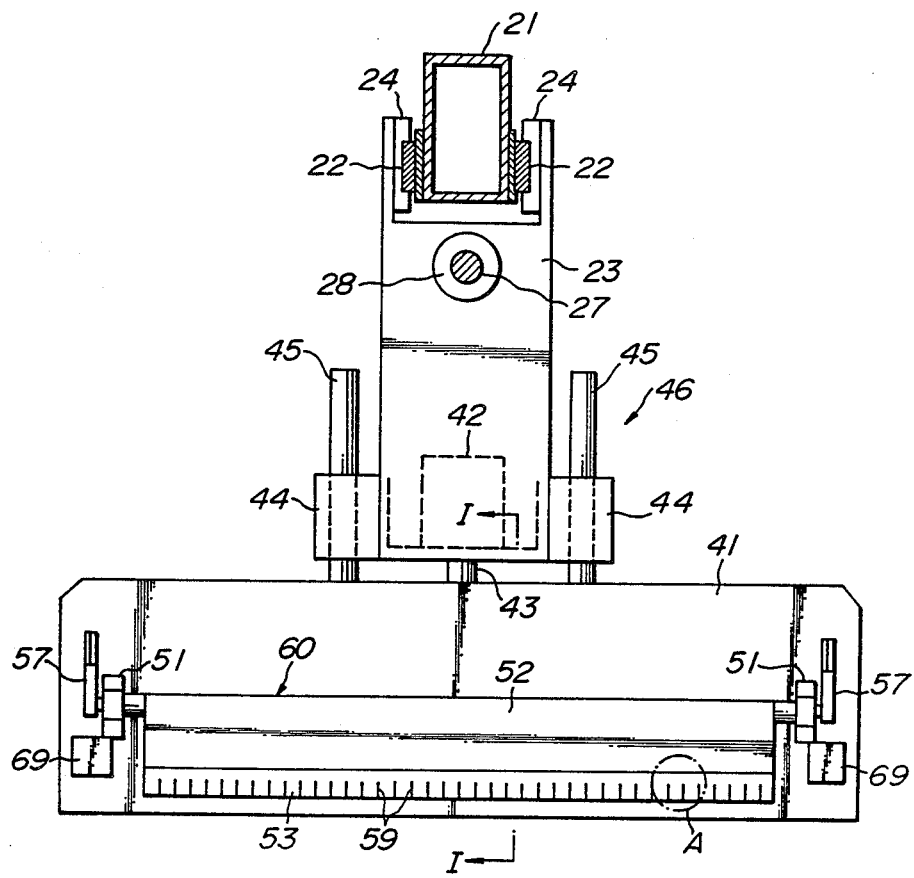
FIG_3

FIG_4
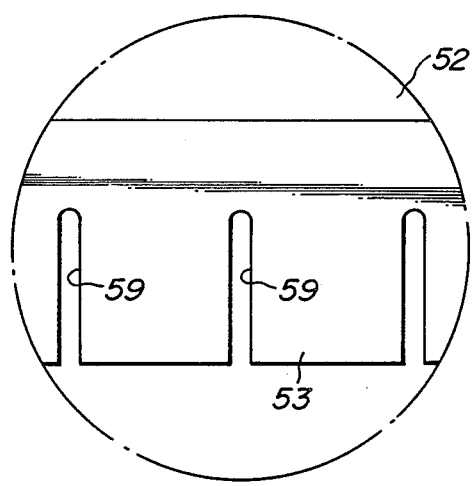
FIG_5
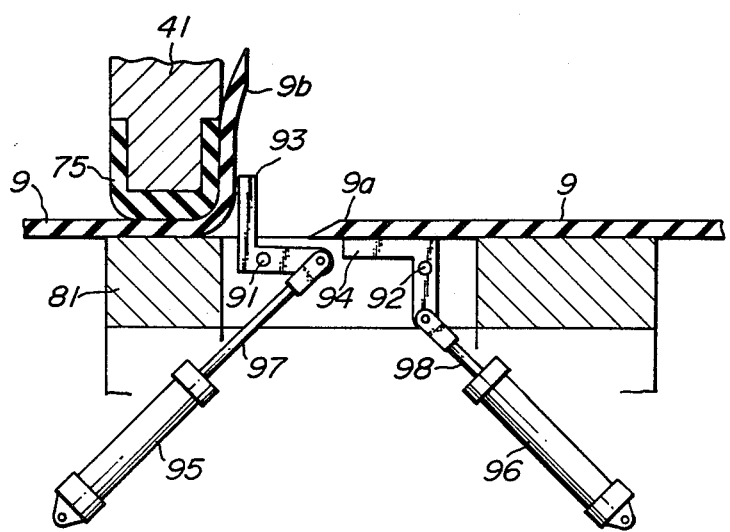

APPARATUS FOR GRASPING ENDS OF BELT-LIKE MEMBERS

BACKGROUND OF THE INVENTION

This invention relates to an apparatus for grasping ends of belt-like members.

An apparatus disclosed in, for example, Japanese Patent Application Laid-open No. 59-55,733 has been known as the apparatus for grasping ends of belt-like members. This apparatus includes a suction manifold having a longitudinally extending vacuum passage therein and a plurality of suction cups spaced apart from each other in longitudinal directions and communicating with the vacuum passage. The apparatus grasp ends of a belt-like member with a suction force by sucking the air out of the suction cups through the vacuum passage.

With such an apparatus, however, the suction force has a certain limitation so that the belt-like member is likely to shift on the suction cups or remove therefrom. Moreover, in case of a narrow belt-like member, parts of the suction cups are exposed to atmosphere to lower the suction force, with the result that the belt-like member is shifted or removed from the suction cups.

In order to solve these problems, it could be considered to grasp ends of a belt-like member over their entire widths by a pair of embracing jaws movable toward and away from each other. In this case, however, one of the jaws must be inserted between a support base and the end of the belt-like member supported by the base, so that the end of the material is often damaged by the jaws. This problem will be probably solved by controlling the jaw with high accuracy to insert it between the material and the support base. However, such a high accurate control of the jaw will make the apparatus and the control itself complicated and expensive.

SUMMARY OF THE INVENTION

It is a principal object of the invention to provide an improved apparatus for grasping ends of belt-like member, which can grasp the ends of the member in reliable manner without any risk of damaging the ends and without requiring any complicated controlling.

In order to achieve the object, an apparatus for grasping ends of a belt-like member comprises a support base for supporting the ends of the belt-like member, embracing member means extending in width directions of the belt-like member and movable toward and away from said support base for urging the ends of the belt-like member against the support base when the embracing member means has moved toward said support base, at least one folding member means extendible from and retractable into the support base for folding the ends of the belt-like member along edges of said embracing member means when the folding member means has extended from the support base, and embracing plate means supported by the embracing member means movably toward and away from said embracing member means for embracing at least one of the folded ends of the belt-like member over its width in cooperation with said embracing member means when the embracing plate means have moved toward said embracing member means.

In using the apparatus according to the invention, the embracing member is moved to the support base stationarily supporting the belt-like member thereon to urge the end of the belt-like member against the support base. At this time, the folding member has been accommodated in the support member. When the folding member is extended from the support base, the folding member folds ends of the belt-like member nearer to the distal end than the urged portion of the belt-like member along the edge of the embracing member. The embracing plate is moved toward the embracing member to embrace the ends of the folded belt like member by the embracing plate in cooperation with the embracing member. The embracing member and plate under this condition are displaced together to transfer the belt-like member. In this manner, a belt-like member can be embraced or grasped only by folding ends of the belt-like member along edges of the embracing member after the ends of the belt-like member have been urged against the support base by the embracing member. Therefore, the ends of the belt-like member can be securely embraced or grasped in a simple manner without damaging the belt-like member.

The invention will be more fully understood by referring to the following detailed specification and claims taken in connection with the appended drawings.

BRIEF DESCRIPTION OF THE DRAWINGS

FIG. 1 is a sectional view illustrating one embodiment of the invention taken along the line I—I in FIG. 3;

FIG. 2 is a schematic front elevation illustrating the embodiment shown in FIG. 1 partially removed;

FIG. 3 is a sectional view taken along the line III—III in FIG. 2;

FIG. 4 is an enlarged view illustrating the portion encircled by a circle in FIG. 3; and FIG. 5 is a sectional view illustrating another embodiment of the invention.

DESCRIPTION OF THE PREFERRED EMBODIMENTS

Referring to FIGS. 1, 2 and 3, a forming drum 1 for forming green tires is rotated by required rotating numbers at any rotating speeds by means of a DC servomotor 3 with a reduction gear arranged on a floor 2. A servicer 5 is arranged on the floor 2 rearwardly of the forming drum. Transfer means 8 comprising a number of rollers 7 in parallel with the forming drum 1 is supported on a frame 6 of the servicer 5 for transferring a continuous belt-like member 9 toward the forming drum 1.

On a front end of the frame 6 is arranged restraining means 11 which urges the belt-like member 9 over its width against a support base 81 later described to prevent displacement and deformation of the member 9. The restraining means includes a pair of bearings 12 mounted on the frame 6 and pivotally supporting a pivotal plate 13 extending in width directions of the belt-like member 9. A restraining plate 14 made of a leaf spring is attached to the pivotal plate 13. The restraining plate 14 is formed with a number of slits (not shown) spaced apart from each other in longitudinal directions of the plate 14, so that even if there are protrusions or depressions on an upper surface of the member 9, the plate 14 will deform following to the protrusions or depressions so as to uniformly restrain the member 9. To the frame 6 is connected a cylinder 15 having a piston rod 16 whose end is connected to a lever 17 which in turn is connected to a pivotal plate 13. The bearing 12, the pivotal plate 13, the restraining plate 14 and the cylinder 15 form the restraining means 11 as a whole.

Above the forming drum 1 there is provided a beam 21 extending in member moving directions and having horizontal rails 22 fixed to both side surfaces of the beam 21. A movable frame 23 includes sliders 24 fixed to an upper inside of the frame 23 and is suspended from the beam 21 with the aid of the sliders 24 fitted between the horizontal rails 22 and movable along the rails 22. To a lower surface of the beam 21 are secured a pair of bearings 25 and 26 spaced in longitudinal directions of the beam 21 and rotatably supporting a screw shaft 27 which is adapted to be threadedly engaged with an internally threaded block or nut 28 fixed to the movable frame 23. A DC servomotor 29 is fixed to the beam 21 rearwardly of the bearing 26. A belt 32 extends about a pulley 30 fixed to an output shaft of the motor 29 and a pulley 31 fixed to the screw shaft 27. As a result, when the motor 29 is energized to rotate the screw shaft 27, the movable frame 23 is reciprocatively moved along the rails 22. The movable frame 23, the screw shaft 27, and the motor 29 form reciprocating means 33 for reciprocatively moving embracing means 60 and 74 later described between a top of the forming drum 1 and the restraining means 11.

Below the movable frame 23 is arranged a horizontal embracing member 41 in the form of a plate extending in width directions of the belt-like member 9. To a center portion of an upper end of the embracing member 41 is connected an outer end of a piston rod of a cylinder 42 fixed to a lower end of the movable frame 23. To the lower end of the movable frame are fixed a pair of slide bearings 44 through which guide rods 45 fixed to the embracing member 41 are slidably inserted. As a result, when the cylinder 42 is actuated, the embracing member 41 is raised or lowered guided by the guide rods 45. The cylinder 42 and the guide rods 45 form lifting means 46 as a whole for raising and lowering the embracing member 41 toward and away from the support base 81.

A pair of bearings 51 are fixed on a forward surface of the embracing member 41 on an opposite side of the restraining means 11 with respect to the forming drum 1 near to both ends of the embracing member 41. The pair of bearings 51 rotatably support both ends of a rockable plate 52 in parallel with the embracing member 41. To a front end of the rockable plate 52 is fixed an embracing plate 53 made of a thin leaf spring having a length substantially equal to that of the rockable plate 52.

Cylinders 54 are fixed to a rearward surface of the embracing member 41 facing to the restraining means 11 near to both the ends of the member 41. Piston rods 55 of the cylinders 54 extend through the embracing member 41 onto the side of the rockable plate 52. Pins 56 are fixed to outer ends of the piston rods 55 of the cylinders 54 (FIG. 1). To longitudinal ends of the rockable plate 52 are connected bottoms of levers 57, respectively, whose upper ends are formed with elongated apertures 58 into which the pins 56 are inserted. The embracing plate 53 is formed with a number of slits 59 equally spaced in its longitudinal directions and extending in width directions to open at a lower end of the embracing plate 53 (FIG. 4). When the cylinders 54 are actuated to rock the rockable plate 52, the embracing plate 53 is moved toward and away from the forward surface of the embracing member 41 so that a leading end of the belt-like member 9 is embraced over its width by the embracing plate 53 in cooperation with the embracing member 41 when the embracing plate 53 has been moved toward the embracing member 41. The bearings 51, the rockable plate 52, the embracing plate 53, the cylinders 54 and the levers 57 form, as a whole, leading end embracing means for embracing the leading end of the belt-like member 9.

Onto the rearward surface of the embracing member 41 facing to the restraining means 11 are secured bearings 66, a rockable plate 67 and an embracing plate 68 similar in construction to the above bearings 51, the rockable plate 52 and the embracing plate 53. The rockable plate 67 and the embracing plate 68 are connected to ends of piston rods 70 of cylinders 69 mounted onto the forward surface of the embracing member 41 through levers 71 formed with elongated apertures 72 and pins 73 in the same manner as above described.

When the cylinders 69 are actuated, the embracing plate 68 is moved toward and away from the rearward surface of the embracing member 41 so that a trailing end 9b of the belt-like member 9 is embraced over its width by the embracing plate 68 in cooperation with the embracing member 41 when the embracing plate 68 has been moved toward the embracing member 41. The bearings 66, the rockable plate 67, the embracing plate 68, the cylinders 69 and the levers 71 form, as a whole, trailing end embracing means 74.

As the embracing plates 53 and 68 are formed with the number of slits 59, the plates 53 and 68 will deform following to protrusions or depressions so as to uniformly restrain the member 9, even if there are such protrusions or depressions on the upper surface of the member 9.

In this embodiment, there are provided the embracing plates 53 and 68 on forward and rearward sides of the embracing member 41, respectively. Therefore, both the leading and trailing ends 9a and 9b of the belt-like member 9 can be embraced, although the apparatus is simple in construction. Moreover, a cover 75 made of silicon rubber or the like is secured to a lower end of the embracing member 41. As a result, when the embracing member 41 is urged against the belt-like member 9, the cover 75 prevents the embracing member 41 from closely contacting the belt-like member 9 so that even if there are protrusions or depressions on the surface of the belt-like member 9, the cover 75 will deform following to such protrusions or depressions to urge the belt-like member 9 against the support base 81 uniformly over the width of the member 9.

The support base 81 having a flat upper surface is mounted on the frame 6 at a location forward of the restraining means 11 (FIG. 2). The support base 81 is formed with a receiving groove 82 extending in longitudinal directions of the support base 81 in an upper surface substantially at a mid portion of the base 81 (FIG. 1). A folding member 83 is fitted in the receiving groove 82 of the support base 81 in parallel therewith and is connected to an upper end of a piston rod 85 of a cylinder 84 secured to the support base 81. As a result, when the cylinder 84 is actuated, the folding member 83 is raised out of or lowered into the receiving groove 82 of the support base 81. The folding member 83 includes along forward and rearward edges elongated notches 89 meeting with configurations of folded belt-like member at the edges of the cover 75. Moreover, a blade receiver 88 made of, for example, teflon is fitted and fixed in a groove formed in the folding member 83 at its mid portion. The blade receiver 88 serves to receive and guard a blade tip 87 of a cutter 86 arranged above the restraining means 11 when the cutter 86 forward advanced is cutting the belt-like member 9.

The operation of the apparatus as described in the embodiment of the invention will be explained hereinafter.

It is assumed that a belt-like member 9 paid out of a roll (not shown) is stationary on the transfer means 8 so that the belt-like member 9 is embraced between the support base 81 and the restraining plate 14 of the restraining means 11, with a leading end 9a of the member 9 being on the support base 81. After the leading end 9a of the member 9 is embraced by the leading end embracing means 60, the member 9 is transferred to the forming drum 1. For this purpose, the motor 29 is energized to rotate the screw shaft 27 so that the embracing member 41 is moved to a location immediately above the support base 81 slightly rearward of the blade receiver 88.

The cylinder 42 is then actuated to extend its piston rod 43 so that the embracing member 41 is lowered toward the support base 81. This downward movement of the embracing member 41 is stopped when the cover 75 abuts against the belt-like member 9. As a result, the leading end 9a of the belt-like member 9 is urged against the support base 81 by the embracing member 41 which abuts through the cover 75 against a portion of the belt-like member 9 spaced by a slight distance rearwardly of the leading end 9a of the belt-like member 9. At this movement, the piston rod 70 has been retracted into the cylinder 69 and the embracing plate 68 has been urged against the rearward surface of the embracing member 41.

Thereafter, the cylinder 84 is actuated to extend its piston rod 85 so that the folding member 83 is extended from the receiving groove 82. As a result, the forward portion of the leading end of the belt-like member 9 forward of cover 75 is urged by the folding member 83 so as to be folded about a forward edge of the cover 75 toward the forward surface of the cover 75 over the entire width of the member 9. The cylinder 54 is then actuated to extend the piston rod 55 so that the rockable plate 52 is rocked in a counterclockwise direction viewed in FIG. 1 to move the embracing plate 53 toward the forward surface of the embracing member 41. As a result, the bent forward end 9a of the belt-like member 9 is embraced by the embracing plate 53 in cooperation with the embracing member 41. In this manner, the forward end of the belt-like member 9 is simply embraced without any damage.

The cylinder 84 is then actuated to retract the folding member 83 into the receiving groove 82. Thereafter, the cylinder 15 is actuated to retract the piston rod 16 so that the restraining plate 14 is moved away from the support base 81 to release the belt-like member 9. The cylinder 42 is then actuated to retract the piston rod 43 so that the embracing member 41 and the embracing plate 53 embracing the leading end 9a of the belt-like member 9 are raised in unison. At the same time, the motor 29 is actuated to rotate the screw shaft 27, so that the belt-like member 9 securely embraced between the embracing member 41 and the embracing plate 53 is transferred to the forming drum 1. In this case, a required amount of the belt-like member 9 is paid out of the roll above described.

When the embracing member 41 has arrived directly above the forming drum 1, the motor 29 is deenergized. The cylinder 42 is then actuated to lower the embracing member 41 toward the forming drum 1. When the leading end 9a of the belt-like member 9 abuts against the forming drum 1, the actuation of the cylinder 42 is stopped. The cylinder 54 is then actuated to retract its piston rod 55, so that the embracing plate 53 is moved away from the embracing member 41 to release the belt-like member 9 from the embraced condition. After the cylinder 42 is then actuated to raise the embracing member 41, the motor 29 is energized to move the embracing member 41 forward slightly. Thereafter, the cylinder 42 is again actuated to lower the embracing member 41 so that the bent forward end 9a of the belt-like member 9 is pushed down so as to be urged against the forming drum 1.

After the cylinder 42 is then actuated to raise the embracing member 41, the motor 29 is energized to move the embracing member 41 to a location immediately above the support base 81 slightly forward of the blade receiver 88. At this moment, the motor 3 is energized to rotate the forming drum 1 so that the belt-like member 9 is attached to a circumference of the forming drum 1 with an amount substantially corresponding to the outer circumference of the forming drum 1. In this case, a predetermined length of the belt-like member 9 is paid out of the roll above described. The cylinder 15 is then actuated to extend the piston rod 16 so that the restraining plate 14 is moved toward the support base 81 to embrace the belt-like member 9 between the restraining plate 14 and the support base 81, thereby preventing displacement and deformation of the belt-like member 9.

On the other hand, the cylinder 42 is actuated to lower the embracing member 41 toward the support base 81 so that the belt-like member 9 is urged by the embracing member 41 against the support base 81 to prevent the displacement and deformation of the belt-like member 9. At this moment, a portion of the belt-like member 9 to be cut off is positioned between the restraining plate 14 and the embracing member 41, and the blade receiver 88 is positioned directly below the portion of the belt-like member 9 to be cut off. After the belt-like member 9 has been restrained by the restraining plate 14 and the embracing member 41 on both sides of the portion of the member 9 to be cut off, the cutter 86 is advanced to cut the belt-like member 9 over its width by the blade tip 87. Thereafter, the cutter 86 is retracted to its poised position, and the cylinder 69 is actuated to extend the piston rod 70 so as to bring the embracing plate 68 into the opened position.

The cylinder 84 is again actuated to extend the folding member 83 from the receiving groove 82 so that the trailing end 9b of the belt like member 9 is bent or folded toward the rearward surface of the cover 75 over the width of the belt-like member 9 as shown in phantom lines in FIG. 1. The cylinder 69 is then actuated t retract the piston rod 70 so that the embracing plate 68 is moved toward the rearward surface of the embracing member 41 to embrace the bent rearward end 9b of the belt-like member 9 over its width between the embracing plate 68 and the embracing member 41.

After the cylinder 84 is then actuated to retract the folding member 83 into the receiving groove 82, the cylinder 42 is actuated to raise the embracing member 41, the embracing plate 68 and the trailing end 9b of the belt-like member 9 in unison. The motor 29 is then energized to transfer these embracing member 41, the embracing plate 68 and the trailing end 9b of the belt-like member 9 toward the forming drum 1. In this case, the motor 3 is energized to rotate the forming drum 1 such that a ratio of a circumferential speed of the forming drum 1 to a moving speed of the embracing member 41 is substantially constant, whereby the remaining portion of the belt-like member 9 is attached to the outer circumference of the forming drum 1 under a proper tensile force. When the embracing member 41 has arrived immediately above the forming drum 1, the motor 29 is deenergized.

The cylinder 42 is then actuated to lower the embracing member 41 so that the trailing end 9b of the belt-like member 9 is urged against the forming drum 1. The cylinder 69 is then actuated to extend the piston rod 70 so that the embracing plate 68 is moved away from the embracing member 41 to release the trailing end 9b of the belt-like member 9 from the embraced condition. After the cylinder 42 is then actuated to raise the embracing member 41, the forming drum 1 is slightly rotated by the motor 3.

The cylinder 42 is then actuated to lower the embracing-member 41 so that the bent trailing end 9b of the belt-like member 9 is pushed down onto the outer circumference of the forming drum 1 by the embracing member 41 so as to be urged thereagainst. As a result, the belt-like member 9 is attached on the circumference of the forming drum 1 with the length of the member 9 substantially corresponding to the outer circumference of the forming drum 1, and the leading and trailing ends of the belt-like member 9 are jointed in butting against or slightly overlapping each other. The cylinder 42 is then actuated to raise the embracing member 41, and the cylinder 69 is actuated to retract the piston rod 70 to urge the embracing plate 68 against the rearward surface of the embracing member 41. The above sequence is one cycle of the operation in the embodiment of the invention. Thereafter, this cycle is repeated.

FIG. 5 illustrates another embodiment of the invention. In this embodiment, L-shaped folding members 93 and 94 are used which are pivotally supported on a support base 81 by means of pins 91 and 92. To ends of the L-shaped folding members 93 and 94 are connected outer ends of piston rods 97 and 98 of cylinders 95 and 96, respectively. When the piston rods 97 and 98 are extended, arms of the L-shaped members 93 and 94 are upstandingly extended from the support base 81, respectively. On the other hand, when the piston rods 97 and 98 are retracted, the arms are pivotally moved so as to be received in the support base 81 so that the arms are flush with an upper surface of the support base 81. FIG. 5 illustrates the L-shaped folding member 93 whose arm vertically extends from the support base 81 with a trailing end 9b of a belt-like member 9 being bent by the arm. The L-shaped folding member 94 serves to fold a leading end 9a of the belt-like member 9.

In the present invention, moreover, only either of the leading and trailing end embracing means 60 and 74 may be provided, although both the means 60 and 74 have been provided in the above embodiment.

As can be seen from the above explanation, a belt-like member can be embraced or grasped only by folding ends of the belt-like member along edges of the embracing member after the ends of the belt-like member have been urged against the support base by the embracing member. Therefore, the ends of the belt-like member can be securely embraced or grasped in a simple manner without damaging the belt like member.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An apparatus for grasping ends of a belt like member, comprising a support base for supporting the ends of the belt like member, embracing member means extending in width directions of the belt-like member and movable toward and away from said support base for urging the ends of the belt-like member against the support base when the embracing member means has moved toward said support base, at least one folding member means extendible from and retractable into the support base for folding the ends of the belt-like member along edges of said embracing member means when the folding member means has extended from the support base, and embracing plate means supported by the embracing member means movably toward and away from said embracing member means for embracing at least one of the folded ends of the belt-like member over its width in cooperation with said embracing member means when the embracing plate means have moved toward said embracing member means.

2. An apparatus as set forth in claim 1, wherein said embracing member means is hanged by means of a piston and cylinder assembly from a movable frame reciprocatively movable in directions in parallel with a feeding direction of the belt-like member, and said piston and cylinder assembly causes said embracing member means to move toward and away from the support base.

3. An apparatus as set forth in claim 1, wherein said folding member means comprises a folding member received in a receiving groove formed in the support base and formed along forward and rearward edges with elongated notches meeting with configurations of folded belt-like member.

4. An apparatus as set forth in claim 3, wherein to said folding member is connected a piston rod of a cylinder secured to a lower side of the support base.

5. An apparatus as set forth in claim 1, wherein said folding member means comprises two L-shaped folding members pivotally connected to the support base, and piston and cylinder assemblies whose piston rods are connected to one arm of the L-shaped folding members, respectively.

6. An apparatus as set forth in claim 1, wherein said embracing plate means comprises an embracing plate formed with a number of slits equally spaced in width directions of the belt-like member and opening at an end to be in contact with the belt-like member.

7. An apparatus as set forth in claim 6, wherein said embracing plate is pivotally connected to said embracing member means and is rockably moved toward and away from the embracing member by means of at least one piston and cylinder assembly secured to the embracing member on a side opposite to the embracing plate and whose piston rod extends through the embracing member onto a side of the embracing plate.

8. An apparatus as set forth in claim 7, wherein a further embracing plate is provided on the opposite side of said embracing plate with respect to the embracing member and at least one further piston and cylinder assembly is provided secured to the embracing member on opposite side of said further embracing plate.

* * * * *